United States Patent
Raman et al.

(10) Patent No.: US 10,885,018 B2
(45) Date of Patent: Jan. 5, 2021

(54) CONTAINERIZATION FOR ELASTIC AND SCALABLE DATABASES

(71) Applicant: Microsoft Technology Licensing, LLC, Redmond, WA (US)

(72) Inventors: Karthik Raman, Sammamish, WA (US); Momin Mahmoud Al-Ghosien, Sammamish, WA (US); Rajeev Sudhakar Bhopi, Mercer Island, WA (US); Madhan Gajendran, Bengaluru (IN); Atul Katiyar, Sammamish, WA (US); Liang Li, Sammamish, WA (US); Ankur Savailal Shah, Redmond, WA (US); Pankaj Sharma, Kirkland, WA (US); Dharma Shukla, Bellevue, WA (US); Hari Sudan Sundar, Redmond, WA (US); Shireesh Kumar Thota, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 193 days.

(21) Appl. No.: 15/991,223

(22) Filed: May 29, 2018

(65) Prior Publication Data

US 2019/0340265 A1 Nov. 7, 2019

Related U.S. Application Data

(60) Provisional application No. 62/668,226, filed on May 7, 2018.

(51) Int. Cl.
*G06F 15/16* (2006.01)
*G06F 16/23* (2019.01)
(Continued)

(52) U.S. Cl.
CPC ........ *G06F 16/2365* (2019.01); *G06F 9/5077* (2013.01); *G06F 11/2007* (2013.01);
(Continued)

(58) Field of Classification Search
None
See application file for complete search history.

(56) References Cited

U.S. PATENT DOCUMENTS

| 5,446,880 A | 8/1995 | Balgeman et al. |
| 5,581,753 A | 12/1996 | Terry et al. |

(Continued)

FOREIGN PATENT DOCUMENTS

| CN | 102497410 A | 6/2012 |
| CN | 104935672 A | 9/2015 |

(Continued)

OTHER PUBLICATIONS

"Conflict Resolution", Retreived from https://web.archive.org/web/20120402192233/https:/docs.oracle.com/cd/E11882_01/server.112/e10706/repconflicts.htm, Apr. 2, 2012, 28 Pages.

(Continued)

*Primary Examiner* — Alex Gofman

(74) *Attorney, Agent, or Firm* — Alleman Hall Creasman & Tuttle LLP

(57) ABSTRACT

A data service may be distributed over a set of servers in order to provide a database with properties such as low latency, high availability, and support for various consistency levels. Presented herein is a particular architecture that promotes rapid provisioning to promote scalability and failover; adaptive load-balancing to accommodate fluctuations in demand; and resiliency in the event of various types of failure, such as network partitions or regional outages. For a service comprising a resource set, a container is provided that hosts a set of replicas of a partition, and that (Continued)

is assigned an allocation of computing capabilities of one or more servers. The resource set of the service may be distributed over the replicas of the container. Scalability is achieved by adding replicas to the container, and load-balancing may be provided by splitting, merging, or otherwise refactoring the partition to accommodate anticipated and unanticipated fluctuations in service demand.

19 Claims, 9 Drawing Sheets

(51) Int. Cl.

| | | |
|---|---|---|
| G06F 16/27 | (2019.01) | |
| G06F 11/20 | (2006.01) | |
| G06F 16/22 | (2019.01) | |
| G06F 16/2452 | (2019.01) | |
| G06F 16/28 | (2019.01) | |
| G06F 16/25 | (2019.01) | |
| G06F 16/21 | (2019.01) | |
| H04L 29/08 | (2006.01) | |
| G06F 9/50 | (2006.01) | |
| H04L 12/24 | (2006.01) | |
| H04L 12/911 | (2013.01) | |
| H04L 12/923 | (2013.01) | |
| G06F 16/182 | (2019.01) | |
| G06F 16/903 | (2019.01) | |

(52) U.S. Cl.
CPC ........ *G06F 11/2056* (2013.01); *G06F 16/184* (2019.01); *G06F 16/211* (2019.01); *G06F 16/219* (2019.01); *G06F 16/2246* (2019.01); *G06F 16/2255* (2019.01); *G06F 16/2272* (2019.01); *G06F 16/2452* (2019.01); *G06F 16/252* (2019.01); *G06F 16/258* (2019.01); *G06F 16/27* (2019.01); *G06F 16/28* (2019.01); *G06F 16/903* (2019.01); *H04L 41/0896* (2013.01); *H04L 41/5009* (2013.01); *H04L 41/5019* (2013.01); *H04L 47/72* (2013.01); *H04L 47/762* (2013.01); *H04L 67/1008* (2013.01); *H04L 67/1012* (2013.01); *H04L 67/1034* (2013.01); *G06F 2201/80* (2013.01); *H04L 67/1029* (2013.01)

(56) References Cited

U.S. PATENT DOCUMENTS

| | | | |
|---|---|---|---|
| 5,581,754 A | | 12/1996 | Terry et al. |
| 5,787,262 A | | 7/1998 | Shakib et al. |
| 5,923,850 A | | 7/1999 | Barroux |
| 6,523,032 B1 | | 2/2003 | Sunkara et al. |
| 6,535,874 B2 | | 3/2003 | Purcell |
| 6,925,457 B2 | | 8/2005 | Britton et al. |
| 7,117,221 B2 | | 10/2006 | Hahn et al. |
| 7,269,648 B1 | | 9/2007 | Krishnan et al. |
| 7,509,354 B2 | | 3/2009 | McGarvey |
| 7,606,838 B2 | | 10/2009 | Tobies |
| 7,689,599 B1 | | 3/2010 | Shah et al. |
| 7,751,331 B1 | | 7/2010 | Blair et al. |
| 7,774,473 B2 | | 8/2010 | Elving et al. |
| 7,877,644 B2 | | 1/2011 | Stenzel |
| 8,311,981 B2 | | 11/2012 | Braginsky et al. |
| 8,326,807 B2 | | 12/2012 | Aiyer et al. |
| 8,386,421 B2 | | 2/2013 | Reid et al. |
| 8,392,482 B1 | * | 3/2013 | McAlister ........... G06F 16/1727 |
| | | | 707/899 |
| 8,572,022 B2 | | 10/2013 | Hagan et al. |
| 8,595,267 B2 | | 11/2013 | Sivasubramanian et al. |
| 8,719,313 B2 | | 5/2014 | Swett et al. |
| 8,745,127 B2 | | 6/2014 | Gopal et al. |
| 8,824,286 B2 | | 9/2014 | Lee et al. |
| 8,862,588 B1 | | 10/2014 | Gay et al. |
| 8,880,508 B2 | | 11/2014 | Jeong et al. |
| 8,943,180 B1 | | 1/2015 | Petit-Huguenin |
| 8,972,491 B2 | | 3/2015 | Abu-Libdeh et al. |
| 9,026,493 B1 | | 5/2015 | Weng |
| 9,195,725 B2 | | 11/2015 | Brown et al. |
| 9,219,686 B2 | | 12/2015 | Hilt et al. |
| 9,225,770 B2 | | 12/2015 | Wang et al. |
| 9,230,040 B2 | | 1/2016 | Shukla et al. |
| 9,244,926 B2 | | 1/2016 | Kakivaya et al. |
| 9,292,566 B2 | | 3/2016 | Golab et al. |
| 9,356,793 B1 | | 5/2016 | Drobychev et al. |
| 9,405,474 B2 | | 8/2016 | Shukla et al. |
| 9,411,873 B2 | | 8/2016 | Rath et al. |
| 9,460,129 B2 | | 10/2016 | Mann |
| 9,462,427 B2 | | 10/2016 | Patel et al. |
| 9,471,711 B2 | | 10/2016 | Abadi et al. |
| 9,569,513 B1 | | 2/2017 | Vig et al. |
| 9,619,261 B2 | | 4/2017 | Gaurav et al. |
| 9,632,828 B1 | | 4/2017 | Mehta et al. |
| 9,645,835 B2 | | 5/2017 | Phillips et al. |
| 9,781,124 B2 | | 10/2017 | Goldberg et al. |
| 9,888,067 B1 | * | 2/2018 | Yemini ................. G06Q 10/06 |
| 10,552,443 B1 | | 2/2020 | Wu et al. |
| 2002/0035642 A1 | | 3/2002 | Clarke et al. |
| 2002/0161757 A1 | | 10/2002 | Mock et al. |
| 2003/0037283 A1 | | 2/2003 | Srinivasan et al. |
| 2003/0046396 A1 | | 3/2003 | Richter et al. |
| 2003/0135643 A1 | | 6/2003 | Chiu et al. |
| 2003/0220966 A1 | | 11/2003 | Hepper et al. |
| 2004/0230571 A1 | | 11/2004 | Robertson |
| 2004/0236801 A1 | | 11/2004 | Borden et al. |
| 2005/0138170 A1 | | 6/2005 | Cherkasova et al. |
| 2005/0160133 A1 | | 7/2005 | Greenlee et al. |
| 2006/0106879 A1 | | 5/2006 | Zondervan et al. |
| 2006/0155945 A1 | | 7/2006 | Mcgarvey |
| 2006/0224773 A1 | | 10/2006 | Degenaro et al. |
| 2006/0282836 A1 | | 12/2006 | Barker |
| 2007/0073675 A1 | | 3/2007 | Kaar et al. |
| 2008/0147627 A1 | | 6/2008 | Natkovich et al. |
| 2008/0301025 A1 | | 12/2008 | Boss et al. |
| 2009/0248737 A1 | | 10/2009 | Shukla et al. |
| 2010/0082630 A1 | | 4/2010 | Zagelow et al. |
| 2010/0094838 A1 | | 4/2010 | Kozak |
| 2011/0149743 A1 | | 6/2011 | Agarwal et al. |
| 2011/0258483 A1 | * | 10/2011 | Elson ................. G06F 11/1662 |
| | | | 714/4.11 |
| 2012/0136839 A1 | | 5/2012 | Eberlein et al. |
| 2012/0185444 A1 | * | 7/2012 | Sparkes .............. G06F 16/1734 |
| | | | 707/689 |
| 2013/0064110 A1 | | 3/2013 | Polinati et al. |
| 2013/0159253 A1 | | 6/2013 | Dewall et al. |
| 2013/0232153 A1 | | 9/2013 | Dhuse et al. |
| 2013/0254164 A1 | | 9/2013 | Tsofi et al. |
| 2014/0052761 A1 | | 2/2014 | Teitelbaum |
| 2014/0101298 A1 | | 4/2014 | Shukla et al. |
| 2014/0195514 A1 | | 7/2014 | Stein |
| 2014/0279844 A1 | | 9/2014 | Shukla et al. |
| 2014/0297776 A1 | | 10/2014 | Volvovski et al. |
| 2014/0304371 A1 | | 10/2014 | Mraz et al. |
| 2014/0359348 A1 | | 12/2014 | Volvovski et al. |
| 2015/0026189 A1 | | 1/2015 | Li et al. |
| 2015/0154074 A1 | | 6/2015 | Resch et al. |
| 2015/0195162 A1 | | 7/2015 | Gandham et al. |
| 2015/0269239 A1 | * | 9/2015 | Swift ..................... G06F 16/27 |
| | | | 707/610 |
| 2015/0304983 A1 | | 10/2015 | Krening et al. |
| 2016/0034433 A1 | | 2/2016 | Yamat et al. |
| 2016/0321588 A1 | | 11/2016 | Das et al. |
| 2016/0342645 A1 | | 11/2016 | Tempero et al. |
| 2017/0068713 A1 | | 3/2017 | Joshi et al. |
| 2017/0123948 A1 | | 5/2017 | Dhuse et al. |
| 2017/0199770 A1 | | 7/2017 | Peteva et al. |
| 2017/0201597 A1 | | 7/2017 | Narasimhan et al. |
| 2017/0220651 A1 | | 8/2017 | Mathew et al. |
| 2017/0286180 A1 | | 10/2017 | He et al. |
| 2017/0293540 A1 | * | 10/2017 | Mehta ................. G06F 11/2033 |
| 2017/0308562 A1 | | 10/2017 | Sreekantaiah et al. |

(56) References Cited

U.S. PATENT DOCUMENTS

| | | |
|---|---|---|
| 2017/0318085 A1 | 11/2017 | Shukla et al. |
| 2017/0364345 A1 | 12/2017 | Fontoura et al. |
| 2018/0150331 A1* | 5/2018 | Chen .................... G06F 9/5077 |
| 2018/0316752 A1 | 11/2018 | Hodges et al. |
| 2019/0163391 A1 | 5/2019 | Annamalai et al. |
| 2019/0166019 A1 | 5/2019 | Jagadeesh |
| 2019/0171737 A1* | 6/2019 | Duan .................. G06F 16/2264 |
| 2019/0196878 A1 | 6/2019 | Li |
| 2019/0340166 A1 | 11/2019 | Raman et al. |
| 2019/0340167 A1 | 11/2019 | Raman et al. |
| 2019/0340168 A1 | 11/2019 | Raman et al. |
| 2019/0340273 A1 | 11/2019 | Raman et al. |
| 2019/0340291 A1 | 11/2019 | Raman et al. |
| 2019/0342188 A1 | 11/2019 | Raman et al. |
| 2019/0342379 A1 | 11/2019 | Shukla et al. |
| 2019/0342380 A1 | 11/2019 | Thota et al. |

FOREIGN PATENT DOCUMENTS

| | | |
|---|---|---|
| WO | 9735270 A1 | 9/1997 |
| WO | 2008100795 A1 | 8/2008 |
| WO | 2010048595 A2 | 4/2010 |

OTHER PUBLICATIONS

"Conflict Resolution", Retrieved from https://docs.oracle.com/cd/F49540_01/DOC/server.815/a67791/ch6.htm, Retrieved Date: Aug. 31, 2018, 43 Pages.

"Conflict Resolution Concepts and Architecture", Retrieved from https://docs.oracle.com/cd/B10500_01/server.920/a96567/repconflicts.htm, Nov. 15, 2011, 35 Pages.

"Couchbase Server: Schemaless Data Modeling", Retrieved from https://developer.couchbase.com/documentation/server/3.x/developer/dev-guide-3.0/schemaless.html, Retrieved Date: Nov. 20, 2017, 5 Pages.

"Lotus Notes/Domino Replication Conflict Solver", Retrieved from https://web.archive.org/web/20100306134644/http://www.ytria.com/WebSite.nsf/WebPageRequest/Solutions_scanEZ_ConflictSolveren, Dec. 15, 2005, 2 Pages.

"Master Replication Concepts and Architecture", Retrieved from https://docs.oracle.com/cd/B10501_01/server.920/a96567/repmaster.htm, Feb. 17, 2012, 40 Pages.

"Master-master vs Master-slave Database Architecture?", Retrieved from https://stackoverflow.com/questions/3736969/master-master-vs-master-slave-database-architecture, Retrieved Date: Jul. 2, 2018, 8 Pages.

"Master-to-Slave Replication", Retrieved from https://www.ibm.com/support/knowledgecenter/en/POWER8/p8ha1/example2mastertoslavereplication.htm, Retrieved Date: Jul. 3, 2018, 4 Pages.

"Replica Set Elections", Retrieved from https://docs.mongodb.com/manual/core/replica-set-elections/, Retrieved Date: Jul. 2, 2018, 6 Pages.

Afriansyah, et al., "Model of Load Balancing Using Reliable Algorithm With Multi-Agent System", In Journal of IOP Conference Series: Materials Science and Engineering, vol. 190, Issue 1, Apr. 2017, 9 Pages.

Ardagna, et al., "SLA Based Resource Allocation Policies in Autonomic Environments", In Journal of Parallel and Distributed Computing, vol. 67, Issue 3, Mar. 1, 2007, pp. 259-270.

Fernandez, et al., "Autoscaling Web Applications in Heterogeneous Cloud Infrastructures", In Proceedings of IEEE International Conference on Cloud Engineering, Mar. 11, 2014, 11 Pages.

Gunda, et al., "Multi-master at global scale with Azure Cosmos DB", Retrieved from https://docs.microsoft.com/en-us/azure/cosmos-db/multi-region-writers, May 7, 2018, 9 Pages.

Liu, et al., "Consistency as a Service: Auditing Cloud Consistency", In Journal of IEEE Transactions on Network and Service Management, vol. 11, Issue 1, Mar. 2014, pp. 25-35.

Masha, et al., "Implement a Custom Conflict Resolver for a Merge Article", Retrieved from https://docs.microsoft.com/en-us/sql/relational-databases/replication/implement-a-custom-conflict-resolver-for-a-merge-article?view=sql-server-2017, Mar. 14, 2017, 6 Pages.

Patra, Chandan, "How to Use Consistency Models for Amazon Web Services", Retrieved from https://cloudacademy.com/blog/consistency-models-of-amazon-cloud-services/, Jun. 3, 2016, 9 Pages.

Shukla, et al., "Schema-Agnostic Indexing with Azure DocumentDB", In Proceedings of 41st International Conference on Very Large Data Bases, vol. 8, Issue 12, Aug. 1, 2015, pp. 1668-1679.

Singh, et al., "Server-Storage Virtualization: Integration and Load Balancing in Data Centers", In Proceedings of ACM/IEEE Conference on Supercomputing, Nov. 15, 2008, 12 Pages.

Thomsen, Jakob Holdgaard, "Uber Engineering: The Architecture of Schemaless, Uber Engineering's Trip Datastore Using MySQL", Retrieved from https://eng.uber.com/schemaless-part-two/, Jan. 15, 2016, 8 Pages.

"International Search Report and Written Opinion Issued in PCT Application No. PCT/US2019/031207", dated Jul. 19, 2019, 13 Pages.

"International Search Report and Written Opinion Issued in PCT Application No. PCT/US2019/031204", dated Jul. 19, 2019, 14 Pages.

"International Search Report and Written Opinion Issued in PCT Application No. PCT/US2019/031208", dated Jul. 24, 2019, 15 Pages.

"Non Final Office Action Issued in U.S. Appl. No. 15/991,953", dated Aug. 22, 2019, 21 Pages.

"Notice of Allowance Issued in U.S. Appl. No. 15/991,062", dated Mar. 18, 2020, 9 Pages.

"Final Office Action Issued in U.S. Appl. No. 15/991,632", dated May 19, 2020, 22 Pages.

"Non-Final Office Action Issued in U.S. Appl. No. 15/991,786", dated May 8, 2020, 36 Pages.

"Non-Final Office Action Issued in U.S. Appl. No. 15/991,880", dated Jun. 10, 2020, 37 Pages.

Buckler, Craig, "Flow to Convert XML to a JSON-Like JavaScript Object", Retrieved From: http://www.sitepoint.com/how-to-convert-xml-to-a-javascript-object, Oct. 20, 2011, 9 Pages.

Chan, et al., "Taming XPath Queries by Minimizing Wildcard Steps", In Proceedings of the 30th VLDB Conference, Aug. 31, 2004, pp. 156-167.

He, et al., "Query Language and Access Methods for Graph Databases", In Book Managing and Mining Graph Data, 2010, pp. 125-160.

Kossmann, Donald, "The State of the Art in Distributed Query Processing", In ACM Computing Surveys, vol. 32, No. 4, Dec. 2000, pp. 422-469.

Kraska, et al., "Consistency Rationing in the Cloud: Pay only when it Matters", In Proceedings of the Very Large Data Bases Endowment, vol. 2, Issue 1, Aug. 24, 2009, 12 Pages.

Lim, et al., "Automated Control for Elastic Storage", In Proceedings of the 7th International Conference on Autonomic Computing, Jun. 7, 2010, pp. 1-10.

Moon, et al., "Introducing SSDs to the Hadoop MapReduce Framework", In Proceedings of 7th International Conference on Cloud Computing, Jun. 27, 2014, pp. 272-279.

Xue, et al., "COMET: Client-Oriented Metadata Servcie for Highly Available Distributed File Systems", In Proceedings of 27th International Symposium on Computer Architecture and High Performance Computing (SBAC-PAD), Oct. 17, 2015, pp. 154-161.

"Non Final Office Action Issued in U.S. Appl. No. 15/991,632", dated Jan. 24, 2020, 23 Pages.

"Final Office Action Issued in U.S. Appl. No. 15/991,953", dated Feb. 14, 2020, 24 Pages.

Likness, Jeremy, "Getting Behind the 9-Ball: Cosmos DB Consistency Levels Explained", Retrieved From: https://blog.jeremylikness.com/blog/2018-03-23_getting-behind-the-9ball-cosmosdb-consistency-levels/, Mar. 23, 2018, 8 Pages.

Montazerolghaem, et al., "Overload Control in SIP Networks: A Heuristic Approach based on Mathematical Optimization", In Proceedings of Global Communications Conference (GLOBECOM), Dec. 6, 2015, 6 Pages.

(56) References Cited

OTHER PUBLICATIONS

"Non Final Office Action Issued in U.S. Appl. No. 15/991,953", dated Jul. 16, 2020, 24 Pages.

* cited by examiner

CONTAINERIZATION FOR ELASTIC AND SCALABLE DATABASES

CROSS-REFERENCE TO RELATED APPLICATIONS

This application is a continuation of, and claims priority under 35 U.S.C. §§ 119-120 to, U.S. Patent Application No. 62/668,226, entitled "DISTRIBUTED DATABASES," filed on May 7, 2018, the entirety of which is hereby incorporated by reference as if fully rewritten herein.

BACKGROUND

Within the field of computing, many scenarios involve a data service that is provided by and distributed over a set of servers, such as a database organized according to one of several organization formats and serving various types of workloads. The distribution of services over the set of available servers may be achieved either by an administrator or an automated process in view of numerous interests, such as reducing latency; promoting scalability, such as the capability of the server set to provide additional resources for a service to accommodate anticipated or unanticipated fluctuations in demand; throughput, such as the consistent capability of the server set to satisfy a volume of service demand; availability, such as resiliency of the server set to continue providing hosted data services in the event of server failures and network partitions; and consistency levels, such as a strong consistency level, a bounded staleness consistency level, a session consistency level, a prefix consistency level, and an eventual consistency level. The particular performance requirements for one or more workloads may be formalized in a service level agreement.

Some architectures may promote the adaptability of the server set to accommodate these performance requirements of various services. The architectural variations may also affect the adaptability of the server set in the interest of load-balancing, e.g., maintaining an efficient allocation of the resources of the server set even as computational loads and volume of demanded services changes. Some architectures may hold some resources in reserve, such as a failover server that may typically remain idle and ready to receive a new computational load on behalf of a new or existing service. In some scenarios, provisioning and load-balancing may be performed by an administrator of the server set who is monitoring the computational load of the respective servers; alternatively or additionally, provisioning and load-balancing may be performed, wholly or partly, by automated processes, e.g., in the manner of a "best-fit" algorithm. Many such architectural variations may be utilized to allocate the server resources of the server set.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

Presented herein is a particular architecture of a data service for a distributed database that may provide a number of advantages, such as the efficiency of allocation; the adaptability of the server set to accommodate fluctuations in computational loads and volume of demand; performance requirements In accordance with an embodiment of the present disclosure, a server is provided that performs a service as part of a server set. The server comprises a processor a memory storing instructions that, when executed by the processor, cause the server to create a container to host a set of replicas of a partition of a resource set of the service and assign to the container an allocation of computing capabilities of the server. The server further receives a logical subset of resources of the service for the partition and creates a replica in the container for the set of resources comprising the partition, and therefore performs a portion of the service represented by the partition using the resources of the replica. The server also responds to a request to scale the service, adjust the replica of the container to satisfy the request.

In accordance with an embodiment of the present disclosure, a method is provided for configuring a server to provide a service as part of a server set. The method comprises executing, by the processor, instructions that cause the server to perform in accordance with the techniques presented herein. In particular, the execution of instructions causes the server to create a container to host a set of replicas of a partition of a resource set of the service and assign to the container an allocation of computing capabilities of the server. Execution of the instructions also causes the server to receive a logical subset of resources of the service for the partition and create a replica in the container for the set of resources comprising the partition in order to perform a portion of the service represented by the partition using the resources of the replica. Execution of the instructions also causes the server to respond to a request to scale the service by adjusting the replica of the container to satisfy the request.

In accordance with an embodiment of the techniques presented herein, a method is provided for organizing a server set of servers to provide a service involving a resource set of resources. The method involves partitioning the resource set into a partition set of the partitions, wherein respective partitions comprise a logical subset of the resource set according to a partition key. For a selected partition, a number of replicas for the selected partition is selected; and for respective replicas, a server is chosen from the server set to host the replica. A container is created on the server to host the replica, and the resources of the selected partition are deployed into the container for the replica. Responsive to a request to scale the service, at least one container hosting at least one replica of the service is identified, at least one replica of the container is adjusted to satisfy the request.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

Figure 1:
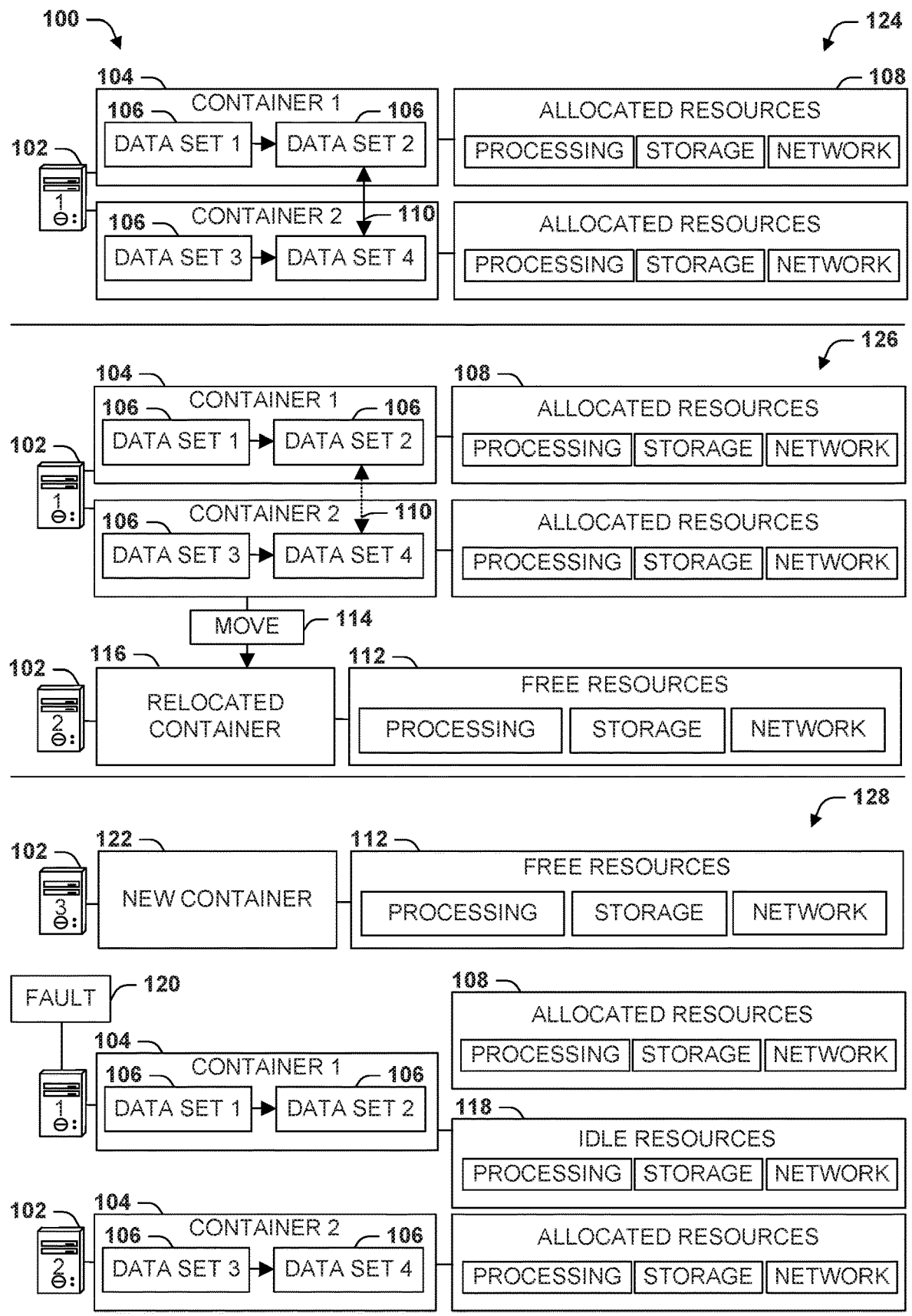
FIG. 1 is an illustration of a set of example scenarios depicting an allocation of resources of a server set.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, well-known structures and devices are shown in block diagram form in order to facilitate describing the claimed subject matter.

A. Introduction

Modern databases support a variety of database models that may be suitable for the data model to be stored and accessed therein. A familiar example is relational data that is organized as a set of tables, wherein respective tables comprise a set of attributes or columns that define a set of value types, and a set of records or rows that respectively provide values for the values of the attributes. Other examples of data that may be stored in a database include: documents that comprise a structured or unstructured collections of entities; graphs comprising sets of nodes (each of which may feature a collection of properties), where nodes are interconnected by various edges, which also exhibit properties such as directionality and/or cardinality; and key/value stores that associate a particular value to a particular key.

For a particular database, the choice of database model is often driven by the nature of the data set to be stored thereby, such as the number of entities, nodes, records, tuples, etc.; the complexity of the interrelationships there among; and the model by which such items are to be accessed, updated, and queried. Other constraints may also play a role, such as performance considerations (e.g., the anticipated volume of requests to be submitted to the database; the concurrency with which such requests are to be fulfilled; and constraints on acceptable delay in fulfilling requests and resilience of the database against data loss or inconsistency) and computational resources (e.g., whether the database is provided by a commodity processor, a robust database server, or a collection of servers that are locally and/or geographically distributed).

Many such architectures are oriented around a partitioning of the resources of a server, such as processing capacity, volatile and nonvolatile storage, and transmission capacity on a bus or network. Such allocation may be selected, e.g., to provide a multi-tenancy server that is capable of executing multiple services, while also reinforcing certain isolation aspects, e.g., preventing a first service from overutilizing a processor and starving a second service of resources, and/or preventing a first service from observing and/or interfering with the data stored by a second service on the same server. Conversely, the partitioning of the resources of the server may also promote adaptability, such as relocation of resources and shifting allocation of servers to accommodate changes in demand.

FIG. 1 is an illustration of an example scenario 100 featuring a conventional technique for provisioning the resources of a service over a set of one or more servers 102. In this example scenario 100, at a first time 124, a server 102 comprises a set of containers 104 that respectively represent a share of the server 102. A first container 104 may store two interrelated data sets 106 (e.g., two tables of a database), and a second container 104 may provide two other interrelated data sets 106 (e.g., two other tables of the database). Each container 104 may be serviced by a set of allocated resources 108 of the server 102, such as a share (e.g., a usage quota) of capacity, storage, and network bandwidth. Additionally, an interrelationship 110 between the data sets 106 may enable the data sets 110 within different containers 104 to interoperate; e.g., the first container 104 may contain a local mapping to a path within the server 102 where a data set 106 in the other container 104 is stored.

At a second time 126, a decision may be made to move 114 the data sets 106 from the second container 106 to a relocated container 116 on a second server 102. The decision to move 114 the data sets 106 may be based, e.g., on a load-balancing choice (e.g., the first server 102 may be overloaded the second server 102 may have spare capacity in the form of free resources 112), and/or to provide resiliency (e.g., the second server 102 may be located in a different region, such that a failure of one server 102 may not necessarily affect the continued availability of the other server 102). Accordingly, the data sets 106 of the second container 104 are relocated into the relocated container 116 of the second server 102, which may utilize the free resources 112 to satisfy the computational demands of the data sets 106 formerly hosted by the first server 102.

At a third time 128, the first server 102 may experience a fault 120, such as a mechanical or electrical malfunction, a corruption or loss of data, or a network partition that renders the first server 102 inaccessible. In order to maintain the availability of the service, a new server 102 that has free resources 112 may be provisioned with a new container 122, and the data sets 106 formerly provided in the first container 106 may be deployed and/or reconstructed in the new container 122 of the new server 102. Additionally, the allocated resources 108 of the first server 102 may be marked as idle resources 118 until the fault 120 is resolved (e.g., the first server 102 may be unusable and/or inaccessible until the fault 120 is resolved). In this manner, the service may be provisioned over the server set 102 in a manner that promotes the adaptability of the servers 102 to changing conditions.

However, in this example scenario 100, a few disadvantages may arise from the provisioning of the servers 102 as sets of containers 104 that involve subsets of allocated resources 108. As a first example, the interrelationship 110 among the containers 102 may be encoded as a local path on the server 102, such that when the second container 104 is relocated from the first server 102 to the second server 102 at the second time 126, the interrelationship 110 is severed (e.g., the first set of tables 106 can no longer find the second set of tables 106 and vice versa). Such inflexiblity may arise, e.g., because the containers 104 are not particularly adapted for relocation, but merely group some data sets 106 for a particular set of allocated resources 108 of the server 102. As a second example, when a fault 120 arises such as at the third time 128, a new server 102 may have to be provisioned from scratch with a new container 122, e.g., as a new allocation of free resources 112. The allocation may take some time, which may delay the deployment of the new server 102 in response to the fault 120 and therefore jeopardize an availability guarantee of the service.

B. Presented Techniques

In view of the limitations in the example scenario 100 of FIG. 1, it may be desirable to adapt the allocation of servers 102 in a manner that promotes portability of the containers 104 and the data sets 106 contained therein. That is, rather than providing the containers 104 merely as groups of resources (such as data sets 106) existing on a server 102 and using a set of allocated resources 108, it may be desirable to provide a hierarchical arrangement of resources—one that separates the logical structure and interrelationships from the distribution over servers 102 and allocation of computational resources. The logical structure may remain intact while the physical distribution of servers and services changes, such that portability of resources may be achieved without jeopardizing the logical relationships among the resources.

Figure 2:
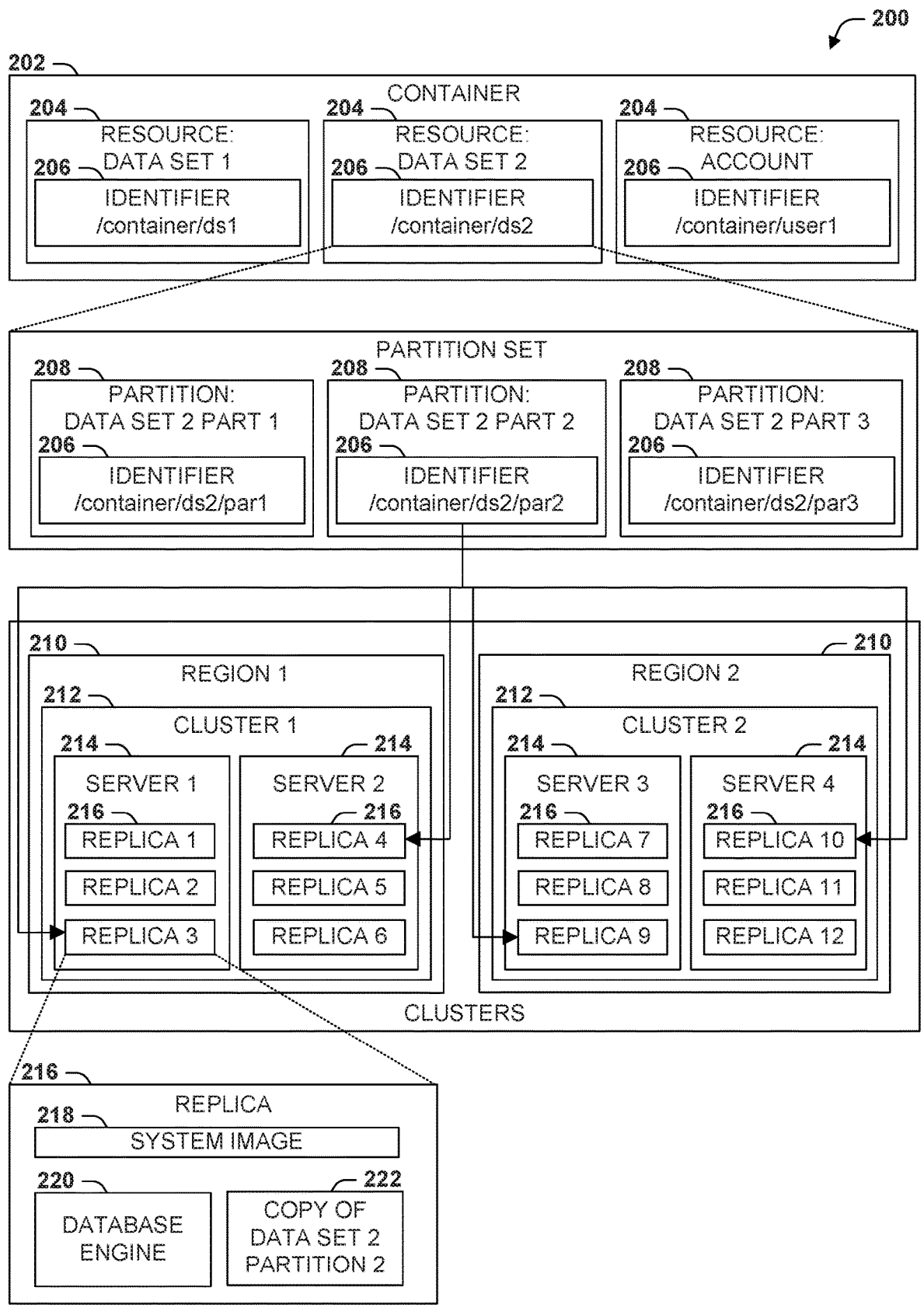
FIG. 2 is an illustration of a set of example scenarios depicting an allocation of resources of a server in accordance with the techniques presented herein.

FIG. 2 is an illustration of an example scenario 200 featuring an alternative server architecture in accordance with the techniques presented herein. In this example scenario 200, a container 202 is provided as asset of resources 204 that comprise a service. The respective resources 204 are identified by a logical identifier 206, which corresponds to a particular partition set of partitions 208 that together comprise a distribution of the resource 204. The respective partitions 208 are also identified by a partition identifier 206, such as a partition key that distinctively identifies both the partition 208 (as compared with the other partitions 208 of the partition set) and the resource 204 for which the partition set is provided.

As further shown in the example scenario 200 of FIG. 2, the respective partitions 208 are serviced by a set of replicas 216 that are respectively provisioned among a set of servers 214. The servers 214 may be provided in different clusters 212, which, in turn, may be provided in one or more regions 210. For a service such as a distributed database, the respective replicas 216 may comprise a system image 218 (e.g., an operating system) and a standalone copy of a database engine 220 and a copy 222 of the data set 204 hosted by the partition 222.

Figure 3:
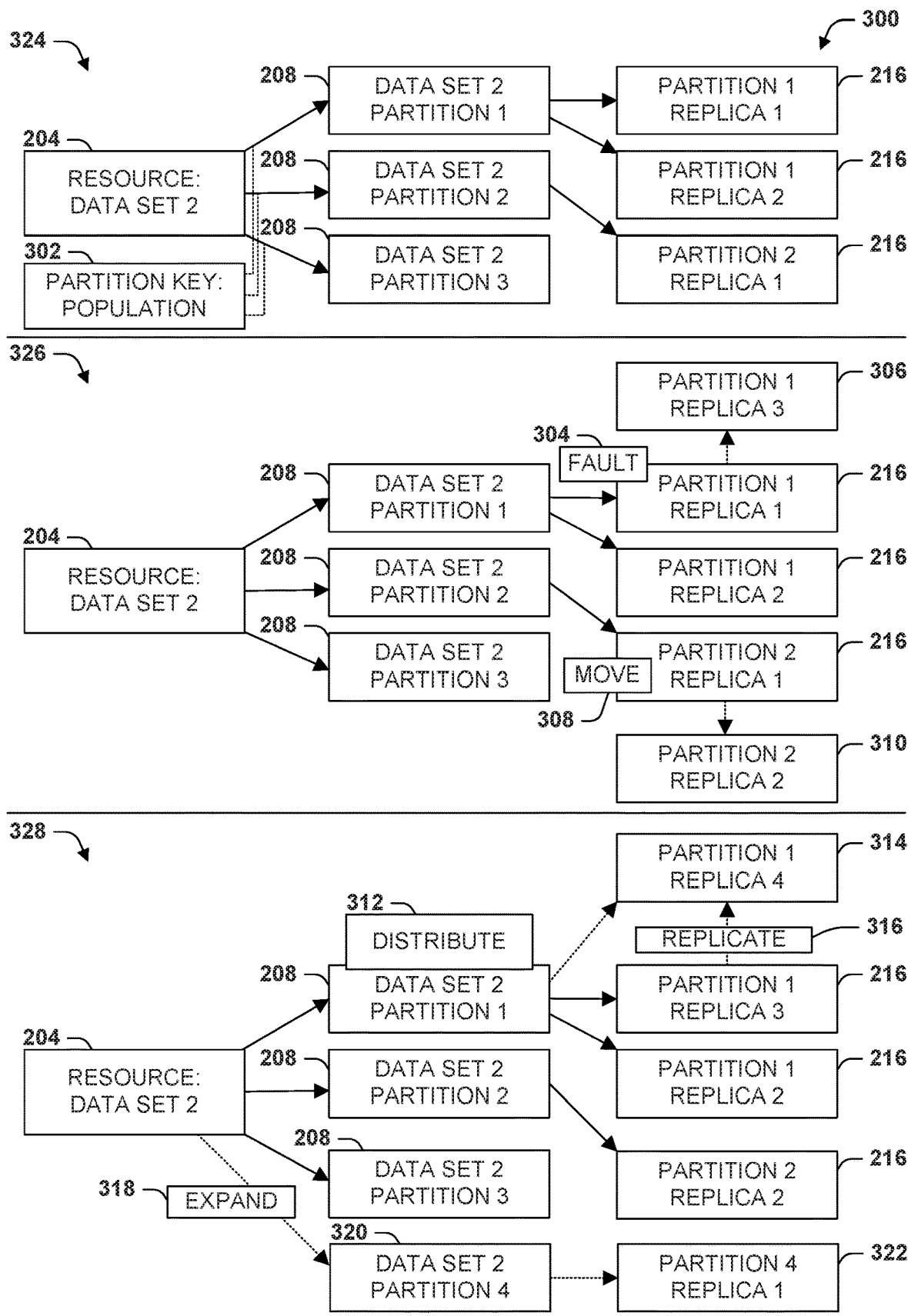
FIG. 3 is an illustration an example partitioning of a server set to accommodate the resources of a service in accordance with the techniques presented herein.

FIG. 3 is an illustration of an example scenario 300 in which a data set of a resource 204 is partitioned over a set of replicas in accordance with the techniques presented herein. In this example scenario 300, at a first time 324, the resource 204 is divided into a set of partitions 208 by a partition key 302, such as a population identifier that indicates the respective populations that for which the portions of the data set 204 in each are provided. The respective partitions 208 may be hosted by one or more replicas 204, which may include redundancy (e.g., the first partition 208 is mirrored over two replicas 204).

As a second time 326, a 304 fault may occur in a particular replica 216 of the first partition 208. The replica 216 may be remapped into an empty replica 306 that is being held available to accept the resources of a different replica 216, such as the system image 218, the database engine 220, and/or the copy 222 of the data set. Additionally, a load-balancing and/or scalability decision may prompt a move 308 of the replica 216 of the second partition 208 to move to a different replica 310 (e.g., a replica in a different region 310, or a new server 102 that provides additional resiliency against faults 304). In contrast with the example scenario of FIG. 1, relocating the resources within the replicas 216 may be handled on a physical architectural level, while reorganizing the logical structure and relationships of the resources of the data set may occur by logically remapping the partitions 208.

At a third time 328, further reorganization of the data set may occur by adjusting the partitions and organization of the replicas 216. As a first example, a choice may be made to distribute 312 the first partition 208 more broadly, e.g., by replicating 316 a particular replica 216 into a mirror replica 314 (e.g., to provide further resiliency against faults 304 or to expand the performance of the first partition 216 by expanding the number of replicas 216 of the first partition 208). As a second example, a decision may be made to expand 318 the data set 204, and may be accomplished without interfering with the first three partitions 208 by adding a fourth partition 320 to the partition set for the resource 204. The logical expansion of the data set 204 to include a new partition 320 may be achieved by provisioning a new replica 322 for the new partition 320 to operate alongside the partitions 216 for the other partitions. In this manner, the architecture of the servers 102 may be allocated in terms of replicas 216, while the logical organization of the resources 204 of the service may be addressed as a set of partitions 208 that are individually mapped to one or more replicas 216, in accordance with the techniques presented herein.

C. Example Embodiments

Figure 4:
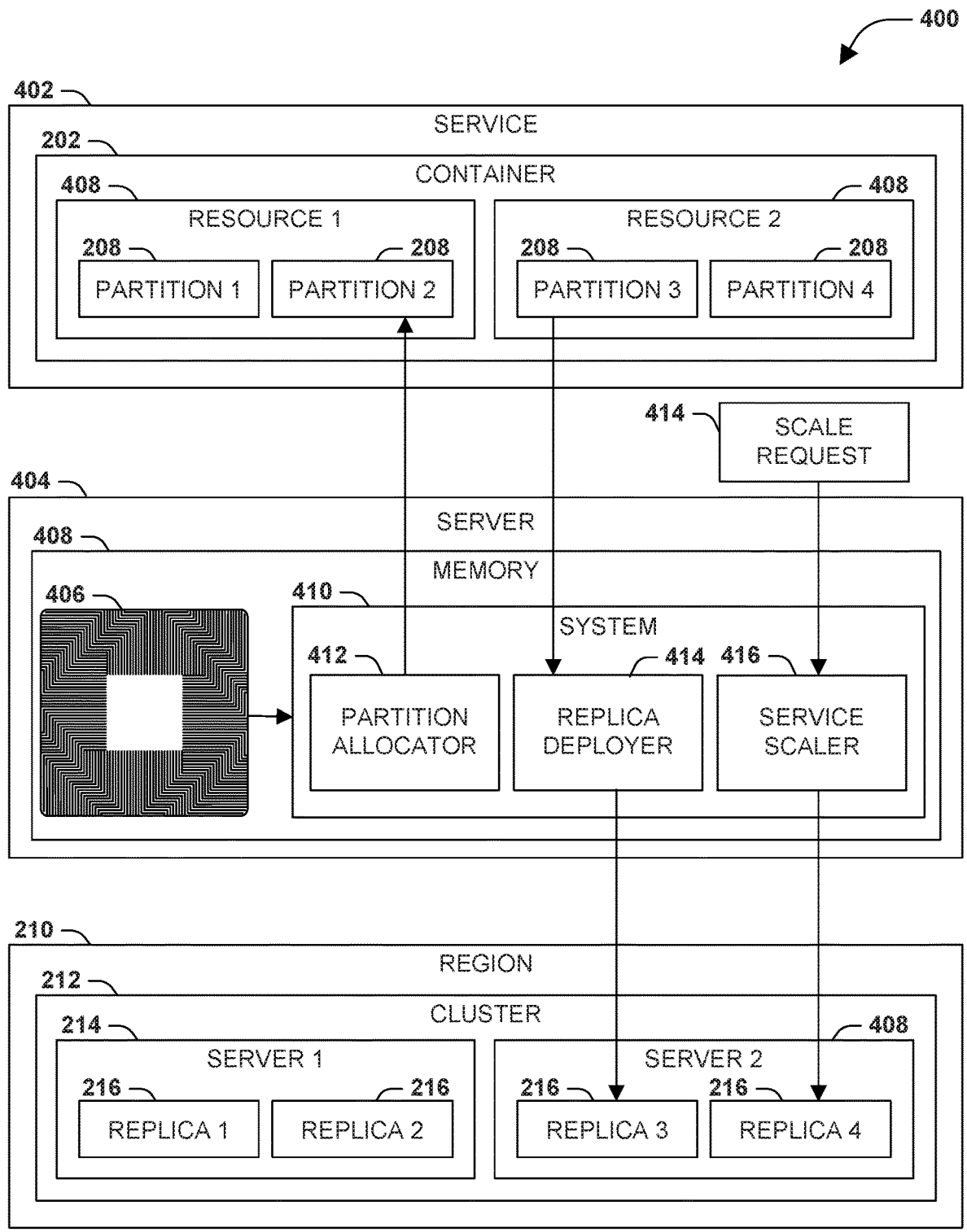
FIG. 4 is a component block diagram illustrating an example server featuring an example system for providing a database using a base representation in accordance with the techniques presented herein.

FIG. 4 is an illustration of an example scenario 400 featuring some example embodiments of the techniques presented herein, including an example server 404 that provides a service 402, and an example system 410 that causes the example server 404 to provide a service 402, such as a distributed database. The example server 404 comprises a processor 406 and a memory 408 (e.g., a memory circuit, a platter of a hard disk drive, a solid-state storage device, or a magnetic or optical disc) encoding instructions that, when executed by the processor 406 of the example server 404, cause the example server 404 to provide a service 402 in accordance with the techniques presented herein.

The example server 404 comprises a memory 408 storing instructions that, when executed by the processor 406, cause the server 404 to operate in accordance with the techniques presented herein. More particularly, execution of the instructions causes the sever 404 to provide a system 410 of interoperating components that, together, cause the server 404 provide the service 402 in accordance with the techniques presented herein.

The example system 410 comprises a partition allocator 412 that creates a container 202 to host a set of replicas 408 of a partition 208 of a resource set of the service 402. The partition allocator 412 also assigns, to the container 202 of the server 404, an allocation of computing capabilities of the server 404, such as a share of the processor 406; a share of available memory 408, including volatile system memory and/or nonvolatile storage; and/or a share of bus or network capacity. The example system 410 also comprises a replica deployer 414 that receives a logical subset of resources 408 of the service 402 for the partition 208, and that creates a replica 216 in the container 202 for the set of resources 408 comprising the partition 208. In some scenarios, the replicas 216 may be provisioned on a set of servers 214 within a cluster 212 of a region 210, e.g., in order to provide parallel and aggregate computational resources to satisfy the demands of the service 402. The replica deployer 414 deploys the resources 408 of the partitions 208 into the respective replicas 216 on the respective servers 214, thereby causes the servers 214 to perform a portion of the service 402 represented by the partition 208 using the resources of the replicas 216. The example system 410 also comprise a service scaler 416, which responds to a scale request 414 to scale the service 402 by adjusting the replicas 216 allocated for the container 202 to satisfy the scale request 414. For example, in order to accommodate a scale request 414 to increase the computational resources for the service 402, the service scaler 416 may allocate more replicas 216 on the servers 214; expanding the allocated replicas 216 into a second server 408 in the same cluster 212, in a different cluster 212 in the same region 210 or a different region; and/or by splitting partitions 208 over a greater number of replicas 216. Conversely, in order to accommodate a scale request 414 to decrease the computational resources for the service 402, the service scaler 416 may allocate fewer replicas 216 on the servers 214 and/or reduce some of the allocated replicas 216, e.g., by merging two or more partitions 208 into a smaller number of partitions 208 that may be adequately served by the same number or smaller number of replicas 216. In this manner, the example system 410 causes the example server 410 to provide services in accordance with the techniques presented herein.

Figure 5:
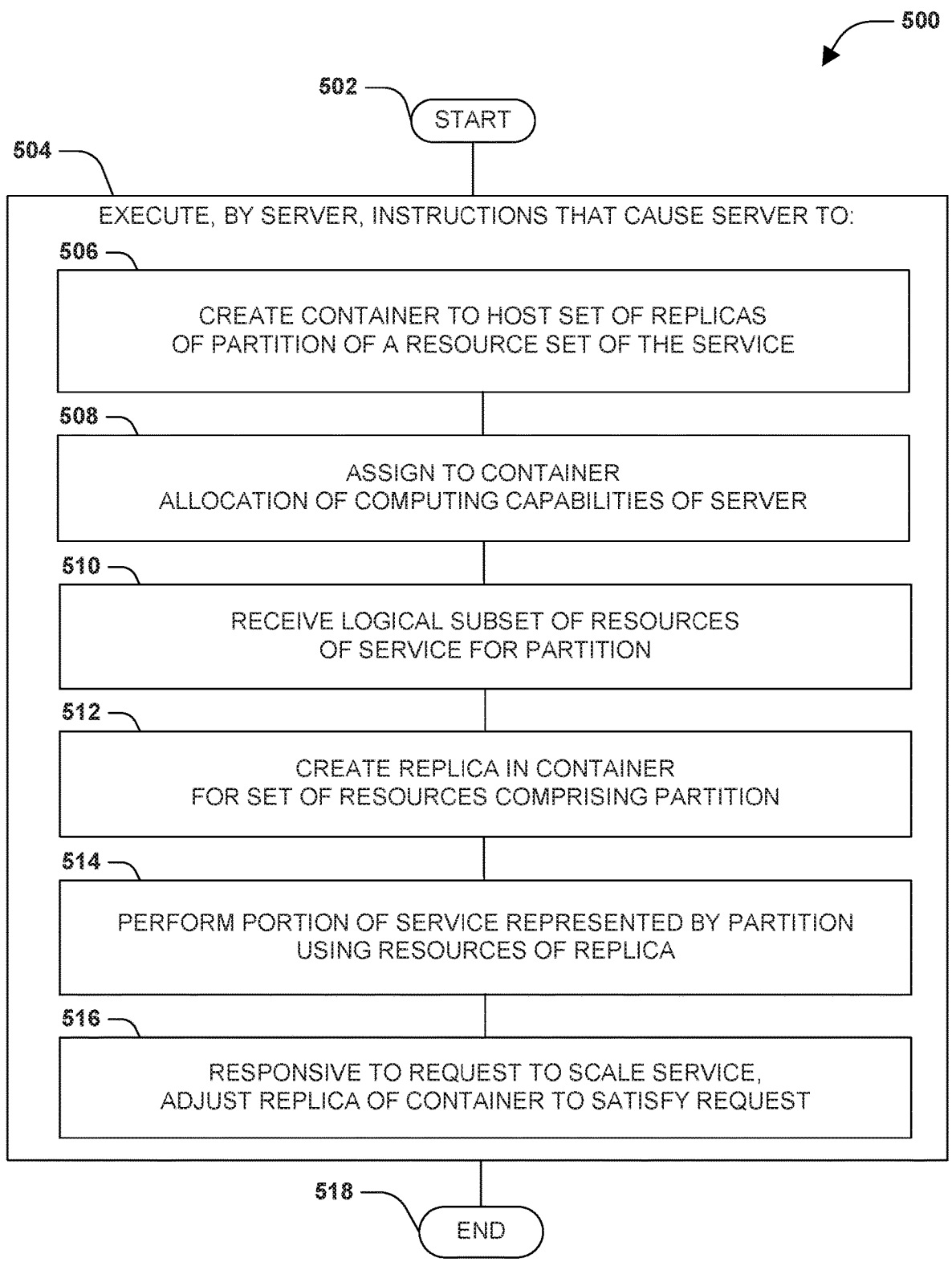
FIG. 5 is a flow diagram illustrating an exemplary method of configuring a server to provide a service in accordance with the techniques presented herein.

FIG. 5 is an illustration of an example scenario featuring a third example embodiment of the techniques presented herein, wherein the example embodiment comprises an example method 500 of configuring a server to provide a service as part of a server set in accordance with techniques presented herein. The example method 500 involves a device comprising a processor 406, and may be implemented, e.g., as a set of instructions stored in a memory 408 of the device, such as firmware, system memory, a hard disk drive, a solid-state storage component, or a magnetic or optical medium, wherein the execution of the instructions by the processor 406 causes the device to operate in accordance with the techniques presented herein.

The first example method 500 begins at 502 and involves executing 504, by the server, instructions that cause the server to perform in the following manner. The execution of the instructions causes the server to create 506 a container to host a set of replicas of a partition of a resource set of the service. Execution of the instructions also causes the server to assign 508 to the container an allocation of computing capabilities of the server. Execution of the instructions also causes the server to receive 510 a logical subset of resources of the service for the partition. Execution of the instructions also causes the server to create 512 a replica in the container for the set of resources comprising the partition. Execution of the instructions also causes the server to perform 514 a portion of the service represented by the partition using the resources of the replica. Execution of the instructions also causes the server to responsive to a request to scale the service, adjust 516 the replica of the container to satisfy the request. In this manner, the example method 500 may enable the server to provide a service in accordance with the techniques presented herein, and so ends at 518.

Figure 6:
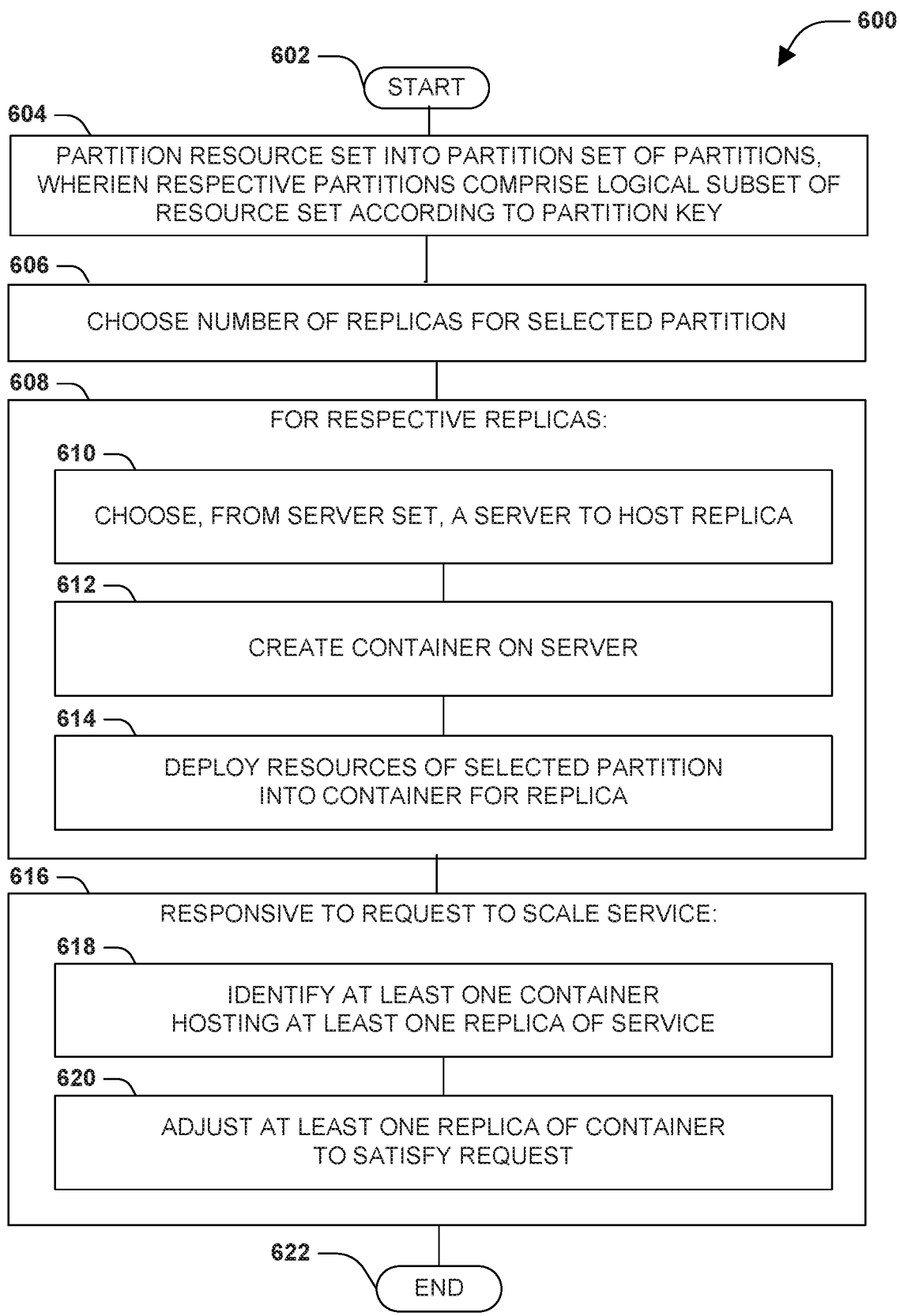
FIG. 6 is a flow diagram illustrating an exemplary method of organizing a server set of servers to provide a service in accordance with the techniques presented herein.

FIG. 6 is an illustration of an example scenario featuring a fourth example embodiment of the techniques presented herein, wherein the example embodiment comprises an example method 600 of organizing a server set of servers to provide a service in accordance with techniques presented herein. The example method 600 begins at 602 and involves partitioning 604 the resource set into a partition set of the partitions, wherein respective partitions comprise a logical subset of the resource set according to a partition key. The example method 600 also involves, for the respective partitions, choosing 606 a number of replicas for the selected partition. The example method 600 also involves, for the respective replicas 608, choosing 610, from the server set, a server to host the replica; creating 612 a container on the server; and deploy 614 the resources of the selected partition into the container for the replica. The example method also involves responding 616 to a request to scale the service by identifying 618 at least one container hosting at least one replica of the service and adjusting 620 the at least one replica of the container to satisfy the request. In this manner, the example method 600 may enable the allocation of the server set of servers to provide the service in accordance with the techniques presented herein, and so ends at 622.

Still another embodiment involves a computer-readable medium comprising processor-executable instructions configured to apply the techniques presented herein. Such computer-readable media may include various types of communications media, such as a signal that may be propagated through various physical phenomena (e.g., an electromagnetic signal, a sound wave signal, or an optical signal) and in various wired scenarios (e.g., via an Ethernet or fiber optic cable) and/or wireless scenarios (e.g., a wireless local area network (WLAN) such as WiFi, a personal area network (PAN) such as Bluetooth, or a cellular or radio network), and which encodes a set of computer-readable instructions that, when executed by a processor of a device, cause the device to implement the techniques presented herein. Such computer-readable media may also include (as a class of technologies that excludes communications media) computer-computer-readable memory devices, such as a memory semiconductor (e.g., a semiconductor utilizing static random access memory (SRAM), dynamic random access memory (DRAM), and/or synchronous dynamic random access memory (SDRAM) technologies), a platter of a hard disk drive, a flash memory device, or a magnetic or optical disc (such as a CD-R, DVD-R, or floppy disc), encoding a set of computer-readable instructions that, when executed by a processor of a device, cause the device to implement the techniques presented herein.

Figure 7:
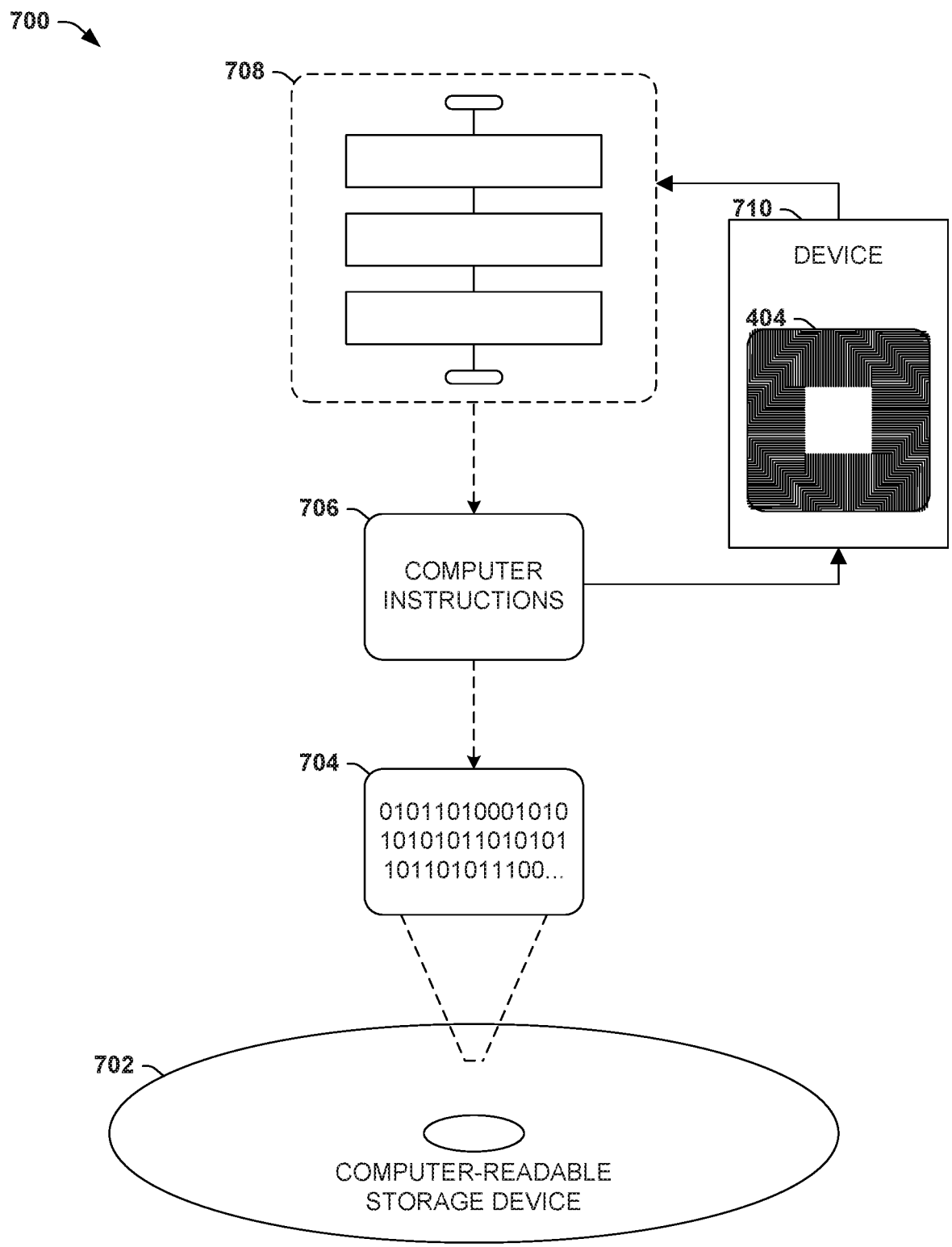
FIG. 7 is an illustration of an example computer-readable medium storing instructions that provide an embodiment of the techniques presented herein.

An example computer-readable medium that may be devised in these ways is illustrated in FIG. 7, wherein the implementation 700 comprises a computer-readable memory device 702 (e.g., a CD-R, DVD-R, or a platter of a hard disk drive), on which is encoded computer-readable data 704. This computer-readable data 704 in turn comprises a set of computer instructions 706 that, when executed on a processor 406 of a server, cause the server to operate according to the principles set forth herein. For example, the processor-executable instructions 706 may encode a system for causing a server to provide a service, such as the example system 410 of FIG. 4. As another example, the processor-executable instructions 706 may encode a method of configuring a server to provide a service, such as the example method 500 of FIG. 5. Many such computer-readable media may be devised by those of ordinary skill in the art that are configured to operate in accordance with the techniques presented herein.

D. Variations

The techniques discussed herein may be devised with variations in many aspects, and some variations may present additional advantages and/or reduce disadvantages with respect to other variations of these and other techniques. Moreover, some variations may be implemented in combination, and some combinations may feature additional advantages and/or reduced disadvantages through synergistic cooperation. The variations may be incorporated in various embodiments (e.g., the first example method of FIG. 4; the second example method of FIG. 5; and the example device 602 and/or example method 608 of FIG. 6) to confer individual and/or synergistic advantages upon such embodiments.

D1. Scenarios

A first aspect that may vary among implementations of these techniques relates to scenarios in which the presented techniques may be utilized.

As a second variation of this first aspect, the presented techniques may be utilized with a variety of servers 92, such as workstations, laptops, consoles, tablets, phones, portable media and/or game players, embedded systems, appliances, vehicles, and wearable devices. The server may also comprise a collection of server units, such as a collection of server processes executing on a device; a personal group of interoperating devices of a user; a local collection of server units comprising a computing cluster; and/or a geographically distributed collection of server units that span a region, including a global-scale distributed database. Such devices may be interconnected in a variety of ways, such as locally wired connections (e.g., a bus architecture such as Universal Serial Bus (USB) or a locally wired network such as Ethernet); locally wireless connections (e.g., Bluetooth connections or a WiFi network); remote wired connections (e.g., long-distance fiber optic connections comprising Internet); and/or remote wireless connections (e.g., cellular communication).

As a second variation of this first aspect, the presented techniques may be utilized with a variety of data and featuring a variety of data models, such as a relational database comprising tabular data organized into tables comprising sets of attributes and sets of rows presenting values for the respective attributes; graph data comprising a graph of nodes with interconnecting edges; key/value pairs of keys and associated values; and documents provided as structured or unstructured collections of entities. Such may also be used in a variety of circumstances, such as data warehousing; content provided through a content system such as a webserver; and object systems for an application or operating system. Some may comprise a hybrid of several data models, which may be aggregated in a horizontal manner (e.g., a collection of items of which some items are provided and/or requested in a first native item format, such as relational data, and other items are provided and/or requested in a second native item format, such as entities within documents) and/or non-horizontal manner (e.g., a collection of items in a first native item format, such as entities within documents, may be described by metadata represented by other items provided in a second native item format, such as relational data).

As a third variation of this first aspect, the presented techniques may be utilized with queries of many types, including many native query formats. For example, the queries may comprise relational queries in a language such as a variant of the Structured Query Language (SQL); graph queries that specify nodes and/or edges of a graph, such as GraphQL queries; key/value queries that request the values associated with a particular subset of keys, such as NoSQL queries; and/or document-oriented queries that request documents and/or entities thereof that meet certain criteria, such as Extensible Path Language (XPath) queries. Additionally, the queries may be specified in a query format of an application language that is utilized by an application of the client, such as a JavaScript Query Language (JQL) query or a Language Integrated Query (LINQ) query. Many such scenarios may be identified in which the techniques presented herein may be advantageously utilized.

D2. Architectural Variations

A second aspect that may vary among embodiments of the techniques presented herein relates to the architecture of the servers 102. As presented in the examples of FIGS. 2-3, the architecture is divided into logical units (e.g., a container 202 of resources 204) and a set of physical allocations of server resources (e.g., replicas 216), and an intermediate layer of partitions 208—wherein each identified by a partition key 208, and each resource 204 comprising one or more partitions 208 that are respectively serviced by one or more replicas 216 in the servers 214 of the distributed server set.

As a first variation of this second aspect, the server further comprises a log, and performing the service may involve recording a set of actions performed by the replica in the log. Recording the actions performed by the replica in a log may be advantageous, e.g., for facilitating rollback of write operations that were unable to complete; verifying an incidence and/or an order of read and write operations against the data set; and/or rebuilding lost portions of the data set, such as following a failure of a server.

As a second variation of this second aspect, a selected resource of the resource set may be associated with a performance capability, such as a latency sensitivity; a throughput, availability, and/or or scalability expectation; and/or a consistency level. For example, an application provided as part of a service within a container may exhibit a sensitivity to latency; an expected and/or measured volume of requests (e.g., an expected average volume or peak volume); and/or a requirement of operating with a certain level of consistency given a distribution of concurrent read and write operations over the distributed server set. The performance requirements may be specified, e.g., in a service level agreement, and/or may be broken down in a variety of ways, such as a geographic distribution (e.g., a first request volume in a first region and a second, different request volume in a different region) and/or chronology (e.g., a first request volume at a first time of day and a second, different request volume at a second, different time of day). A variety of other performance capabilities may also be involved in such selected resources, such as sensitivity to data loss. A request to expand the performance capability of the selected resource may be fulfilled by provisioning a second partition that expands the performance capability of the selected resource. For example, a selected partition may comprise a subset of the resources that are associated with a future event. A request to expand the performance capacity may be presented in response to an anticipated surge of demand for the subset of the resources of the selected partition during the future event. The request may be fulfilled, e.g., by partitioning more replicas for a particular partition and/or by splitting at least one partition into multiple, smaller partitions that may be handled by different replica sets. Conversely, a request to reduce the performance capability of the selected resource may be received, and may be fulfilled, e.g., by reducing the number of replicas comprising the replica set for a partition and/or merging the second partition and the selected partition.

As a third variation of this second aspect, a selected partition may be associated with a performance capacity (e.g., an achievable throughput and/or latency, or a configuration that promotes compliance with a selected consistency level). As an example, a particular server or collection of servers, and/or a collection of interoperating replicas provided thereby, may be evaluated to determine the individual and/or collective latency in processing various types of requests. The evaluation of the performance capabilities of a selected partition may be compared, e.g., with the performance capability for a resource that is serviced by the partition. For example, an application may have a particular expected volume of requests, and the replicas comprising the replica set for one or more partitions of the resource may be measured as an individual or aggregate performance capability and compared with the anticipated performance capability of the resource, e.g., to determine that the performance expectation of the resource is capable of being reliably satisfied by the replicas comprising the partition set for the resource. Additionally, a request to expand the performance capacity of the selected partition (e.g., increasing the performance capability of a resource and/or the performance capability of the replicas of the replica set comprising the selected partition) may be fulfilled by provisioning a second partition that expands the performance capacity of the selected partition (e.g., expanding the size of the partition set to include more partitions that subdivide the resource into finer-grained units, where each partition is serviced by a different replica set of replicas). Conversely, a request to reduce the performance capacity of the selected partition may be fulfilled by merging the second partition and the selected partition (e.g., if demand is anticipated to be reduced and/or the performance capabilities of the partition are determined to exceed the performance capabilities of the resource serviced by the partition, the number of partitions comprising the partition set may be reduced to scale back the provision of computational resources provided to service the resource).

As a fourth variation of this second aspect, a selected partition may be associated with an active daily period and an inactive daily period. For example, demand for a service may be determined and/or estimated to fluctuate over the course of a day, e.g., scaling up during business hours and scaling down during off-hours. Similar fluctuations may be observed, e.g., by the hour, day, week, month, and/or year. A request to expand the performance capacity of the selected partition involve a request to expand the performance capacity of the selected partition during the active daily period (e.g., scaling up the partitions and/or replicas allocated for a resource of the service during business hours). Conversely, a request to reduce the performance capacity may be evaluated as a request to reduce the performance capacity of the selected partition during the inactive daily period (e.g., scaling up the partitions and/or replicas allocated for a resource of the service during off-hours).

As a fifth variation of this second aspect, a selected partition may be associated with a performance load. An embodiment may ensure that the performance load of the partition is satisfactorily performed by comparing the performance load of the selected partition with a high performance load threshold and a low performance load threshold. For example, the latency, throughput, and/or consistency level of a server may be evaluated while processing the replicas comprising the partitions of one or more resources of one or more services. For a variety of reasons, the computational load that is identified for a server, partition, and/or replica may exceed the computational load that is expected for the server, partition, and/or replica (e.g., because the computational demand of the workload exceeded expectations; because the volume of demand for the resource has scaled up; because the performance of the server, replica, and/or partition is below expectations; and/or because other replicas and/or partitions executing on the server are overconsuming server resources and causing the replica and/or partition to exhibit performance below expectations). Responsive to the performance load exceeding a high performance load threshold, the embodiment may provision a second partition that supplements a performance capacity of the selected partition to reduce the performance load. Conversely, responsive to the performance load succeeding the low performance load threshold (e.g., because the computational demand of the workload is below expectations; because the volume of demand for the resource is reduced; because the performance of the server, replica, and/or partition exceeds expectations; and/or because other replicas and/or partitions executing on the server are underconsuming server resources and enabling plentiful computational resources for the replica and/or partition, any or all of which may contribute to idle server resources of the servers processing a workload), an embodiment may merge the second partition and the selected partition.

As a sixth variation of this second aspect, a service may further comprise a service archive that stores inactive records for the service. As a first such example, the service may generate data in a periodic and/or continuous manner, and records older than a particular threshold may be flagged for archiving. As a second such example, the service may monitor accesses of records within the data set of the service to determine records that have not been accessed in a particular period of recency, which may be flagged for archiving. As a third such example, the service may examine the types of data comprising the service to identify different usage patterns (e.g., records that are desirable to retain in active memory even if old and/or not accessed in a while, vs. records that are desirable to archive even if recent and/or recently accessed), and may archive data for data types that are not desirable to retain in active memory. A server operating in accordance with such techniques may receive a record for the service and assign a time-to-live period to the record (e.g., the period of time for which the record is to be retained prior to archiving). The time-to-live may be static and/or uniform for all records, and/or may vary based on the type of record and/or circumstances under which the record is generated. The time-to-live may be identified as a date or time after which the record is to be archived, and/or a duration beyond which the record is to be archived, as measured from a particular reference point in time. The server may detect an elapsing of the time-to-live period for the record, and in response may archive the record in the service archive. Such archiving may comprise, e.g., moving the record to less accessible memory; compressing the record; trimming the record; and/or disposing of the record.

As a seventh variation of this second aspect, a service may further comprise a workload set of at least two workloads that are respectively associated with a workload computation. An embodiment of the presented techniques may assign the allocation of computing capabilities to the container by assigning an allocation of the computing capabilities of the server to the respective workloads of the container. For example, a particular container may provide a service comprising different sets of resources that are associated with different workloads, such as different types of activities that may be performed within the activity. Moreover, such workloads may have different performance capabilities. For example, a first workload of the service provided by a container may involve streaming stored video may be sensitive to throughput, wherein diminished throughput causes a client-side buffer to deplete and the video to pause, but may be relatively tolerant of latency due to the client-side buffering. Conversely, a second workload of the same service provided by the container may involve a comparatively low-fidelity teleconference between two users, which may be tolerant of diminished throughput (e.g., due to the low throughput requirements of the low-fidelity teleconference) but sensitive to latency that causes delayed communication and/or an interruption of the teleconference. Accordingly, the replica sets that are allocated to the partitions of the container may be allocated for different workloads, and may be particularly selected and allocated to satisfy the particular sensitivities of the respective workloads.

As an eighth variation of this second aspect, a service may further comprises a set of actions. An embodiment of the presented techniques may test the service (e.g., to ensure that the performance requirements of a service level agreement may be consistently satisfied by, for respective actions of the service, identifying a sequence of interactions among the replicas that perform the action). While performing the sequence of interactions through the replicas, the embodiment may measure a performance characteristic of the action, and compare the performance characteristic with a threshold performance characteristic. For example, the testing may involve initiating the respective actions within the service, and monitoring the performance capacities of the actions that are achieved by the allocation of replicas and partitions for the actions. When the server set is determined to exceed the performance capability for a particular action (e.g., when the service is overprovisioned), the replicas and/or partitions may be reduced, e.g., by reducing the count of replicas within a replica set, relocating such replicas to more distant and/or lower-performance servers, and/or merging partitions. Conversely, when the server set is determined to be inadequate for the performance capability for a particular action (e.g., when the service is underprovisioned), the replicas and/or partitions may be expanded, e.g., by increasing the count of replicas within a replica set, relocating such replicas to nearer and/or higher-performance servers, and/or splitting partitions to provide a finer-grain distribution of replica sets to service the respective partitions of the resources of the container.

As a ninth variation of this second aspect, a server further comprises a set of unallocated partition spaces. For example, a server may initially be configured as a set of ten replicas that are not allocated for any partition, each of which may store, e.g., a complete system image and database engine. An embodiment of the presented techniques may create a container for a service (comprising a set of resources 204) by selecting an unallocated partition space, and creating the container for the partition in the unallocated partition space of the server. For example, the embodiment may select a number of unallocated replicas among the servers of the server set; choose a distribution of the partitions over the selected replicas (e.g., choosing six empty replicas across three servers, and allocating the six empty replicas as two identical copies of each of three partitions of a resource). The portion of a resource for a particular partition may thereafter be loaded into a replica by simply copying and/or moving data from another replica or data source into the new replica and initiating executing using the preloaded system image and/or database engine, thus promoting rapid scalability of the server set to add replicas to replica sets and/or partitions for respective containers.

As a tenth variation of this second aspect, an embodiment of the presented techniques may designate a selected replica of the partition as a read/write replica for the partition, and may designating other replicas of the partition as a read-only replica. As one example, the servers hosting the respective replicas of the partition may be located in a region, and the designation of the selected replica as a read/write replica may involve identifying a source region that is anticipated to request writes of the partition; and designating, as the read/write replica for the partition, a replica that is located in a region that is closest to the source region. For example, in a "single-master" scenario, a data service may be provided in three regions, but only one region may be provided as a source of updates to the data comprising the data service, while the other two regions may only read or consume the data. The servers and/or replica sets within a partition stored by the first region may therefore be designated as a read/write partition, and the servers and/or replica sets within a partition stored by the other two regions may be designated as read-only partitions. Alternatively, if writes are anticipated to arise in multiple regions, a single region may be designated as the primary write region, such that writes received by partitions in other regions are to be forwarded to the partition for the primary write region. The primary write region may be selected, e.g., as a region of the highest anticipated volume of writes; a region where sensitivity to write latency is highest; and/or a centralized region that is likely to provide an average low write latency over all regions where updates may be received. In some scenarios, the primary write region may change (e.g., designating different regions as the primary write region at different times of the day, such as according to business hour fluctuations around the world). Alternatively, some embodiments may exhibit "multi-master" configurations in which writes to the data set of a service may be received and applied in several of the partitions for the container.

As an eleventh variation of this second aspect, one or more servers that host the respective replicas of the partition are located a region. For example, for respective regions comprising at least one server, a failover region may be designated that hosts a second replica of the partition is located. Responsive to a fault of a selected server hosting a replica, an embodiment of the techniques presented herein may identify the region where the selected server is located, and also the failover region that is associated with the region. The embodiment may identify the failover server in the failover region and initiate failover of the replica to the second replica on the failover server.

As a twelfth variation of this second aspect, the resource set of a service may be may be established as a hierarchical organization, and the hierarchical levels of the hierarchical organization may be selected as the basis for the partition keys of the partitions. For example, the partition keys may be selected to exhibit a logical path through the resources and partitions for each record or data object of the service provided by the container. The respective levels of the path may be identified, e.g., by geography; time of day; activity of the service; data type; and/or data consumer. A server set may be organized by assigning, to a selected partition, a path through the hierarchical organization, wherein the path for the partition is navigated at the hierarchical level using the partition key of the selected partition. As one example, the respective replicas with a logical endpoint. Responsive to detecting a failure of a selected replica, the logical endpoint of the failed replica may be reassigned to a second replica. That is, remapping the logical endpoints from a first logical location within the hierarchical organization to a second logical location within the hierarchical organization may enable a remapping of resources to partitions and replicas, e.g., in response to changes to the logical configuration of the container (e.g., the numbering and or division of partitions) and/or the physical layout of the resources (e.g., the number and arrangement of replicas and replica sets over the servers of the server set).

As a thirteenth variation of this second aspect, a service may be involve an operational workload and an analytic workload (e.g., a first workload that involves a collection and storage of data and a second workload that involves a computational algorithm to be applied over the collected data). Partitioning the resource set may involve generating an operational partition of the resource set to perform the operational workload of the service, and generating an analytic partition of the resource set to perform the analytic workload of the service. As a first example, in a data warehousing scenario, the performance requirements of the operational workload (e.g., the collection and storage of data) may have to be performed under stringent performance requirements, while the analysis of the data may occur under relaxed performance requirements. As a second example, in a realtime processing scenario, the analytic workload may exhibit a higher degree of performance requirements than the operational workload (e.g., if the processing of records or data objects is computationally intensive, and/or if the results of analysis are to be acted upon promptly). In such scenarios, different sets of replicas, replica sets, and partitions may be applied to handle the operational workload and the analytic workload. In some embodiments, the allocation of resources may be prioritized and/or may fluctuate. For example, if the volume of incoming data is anticipated to be larger during the day, replicas may be shifted toward the operational workload during the day (e.g., to receive and store the data) and shifted toward the analytic workload during the evening (e.g., to process received data while intake is low).

As a fourteenth variation of this second aspect, respective servers may be associated with a fault domain that identifies a subset of the servers that are likely to fail together. A server may be chosen to host a replica by identifying a server of the server set that is in a different fault domain than the servers of other replicas of the partition. For example, it may be desirable to distribute replicas over servers such that the failure of a single region does not take all replicas for a particular partition offline. Failover may be provided on a pre-identified and/or prioritized basis, e.g., preferentially initiating failover from the servers of a first region to the servers of a second region that is outside of the fault domain of the first region, but that is closer to and/or easier to transition into the role of the first region than the servers of a third region that is more distant and/or constrained. Many such variations may be provided to allocate the servers of the server set into partitions, replica sets, and replicas in accordance with the techniques presented herein.

Figure 8:
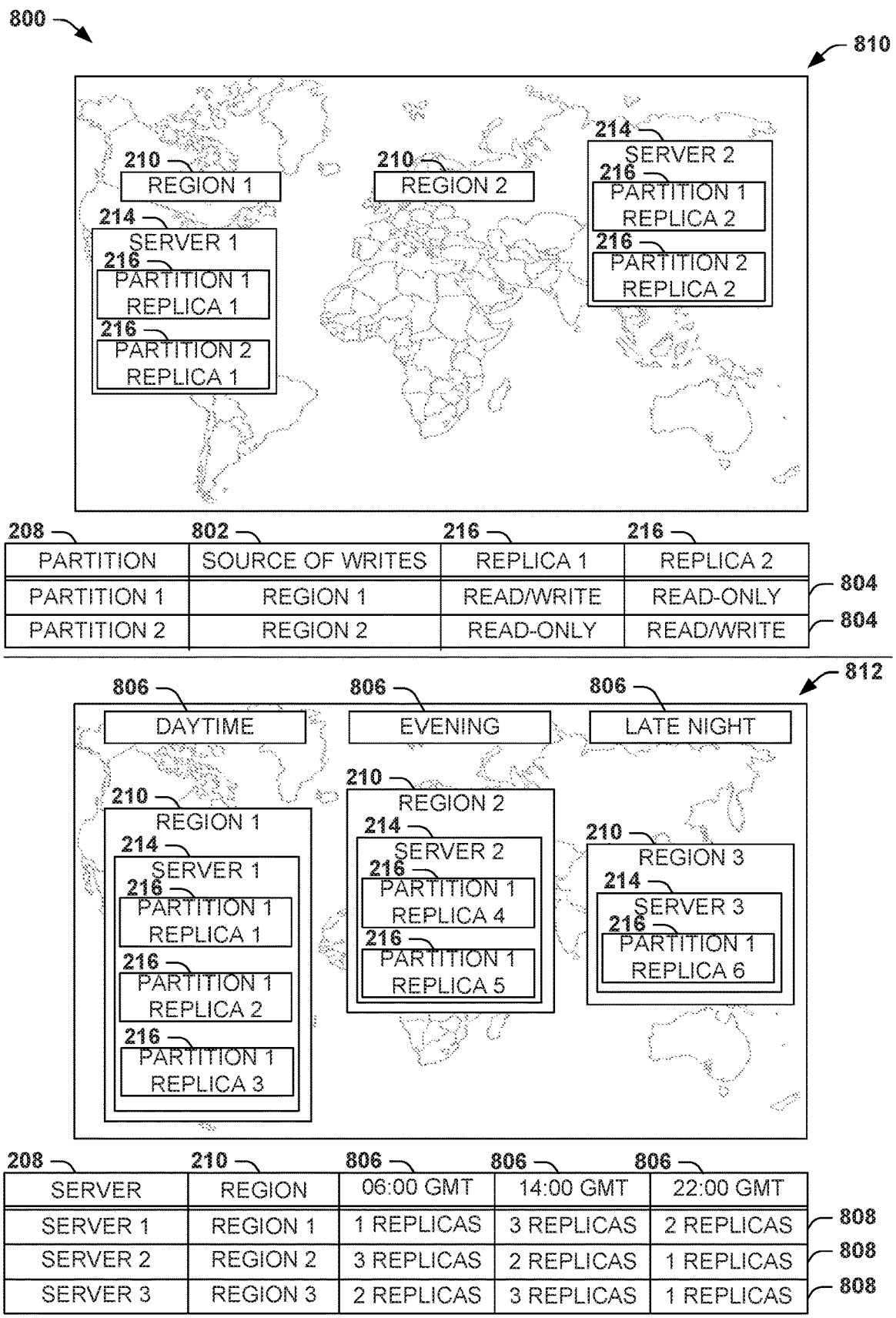
FIG. 8 is an illustration of an example scenario featuring an adaptive distribution of replicas that adapts over time and geography in accordance with the techniques presented herein.

FIG. 8 is an illustration of an example scenario 800 featuring an allocation of servers 102 in accordance with some variations of the techniques presented herein. In this example scenario 800, the servers 214 may be selected in different regions 210 and may be allocated as different collections of replicas 216. The allocation of the replicas 216 over the servers may reflect the sources 802 of writes in each region 210; e.g., a first replica 216 that is provided in a first region 210 may serve as a read/write replica 216 for that partition, while a second replica 216 in a different region 210 that is not a source of writes 802 may be provided as a read-only replica 804. Conversely, a first replica 216 of a second partition that is provided in the first region 210 may serve as a read-only replica 216 for the second partition, while a second replica 216 in a different region 210 that is a source of writes 802 may be provided as a read/write replica 804. Moreover, the selection and designation of the replicas may change as a function of time; e.g., at different times 806, different replica counts 808 of replicas 216 may be provided in different regions, and may periodically shift throughout the day to reflect fluctuations in demand. Many such variations may be included in embodiments of the techniques presented herein.

E. Computing Environment

Figure 9:
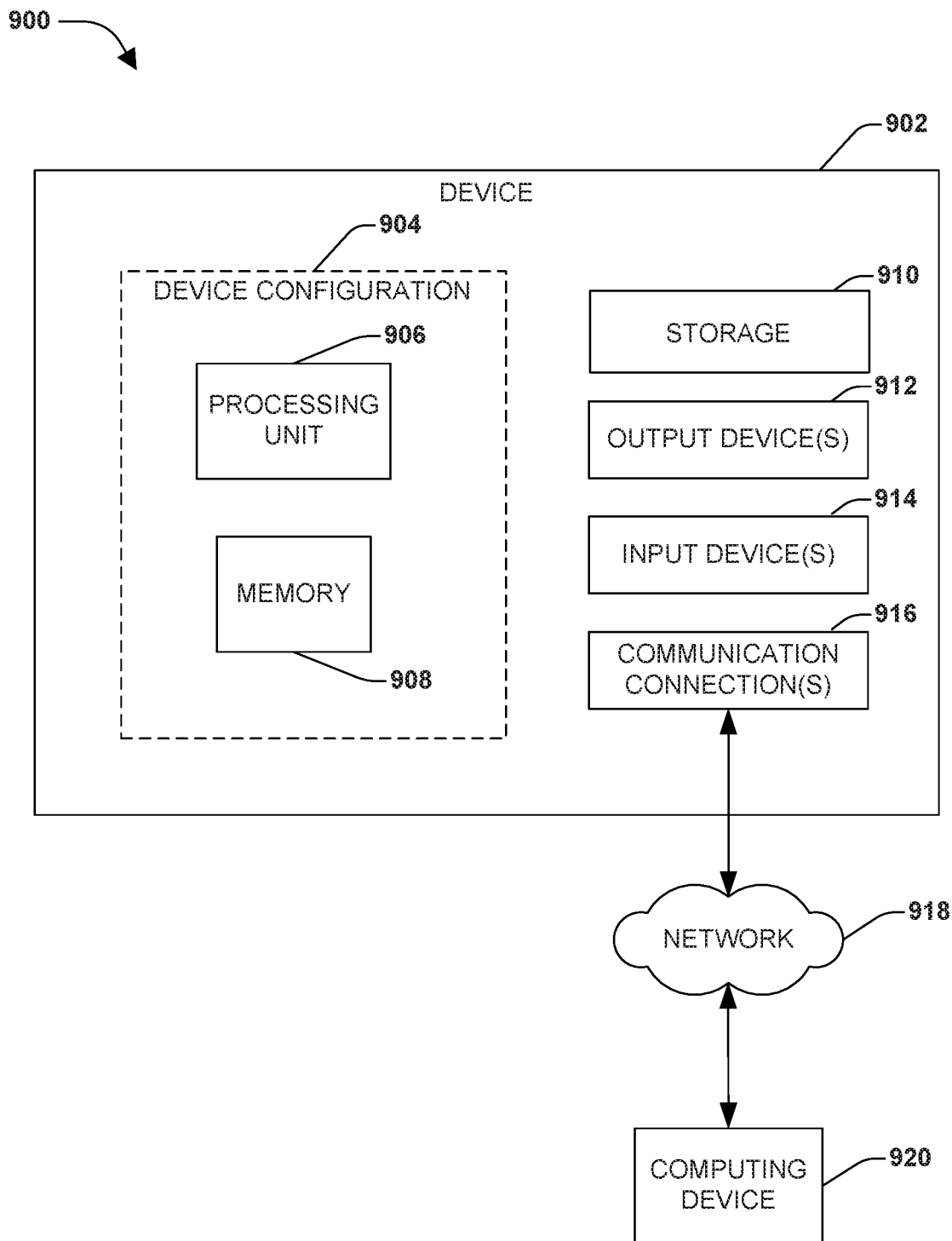
FIG. 9 illustrates an exemplary computing environment wherein one or more of the provisions set forth herein may be implemented.

FIG. 9 and the following discussion provide a brief, general description of a suitable computing environment to implement embodiments of one or more of the provisions set forth herein. The operating environment of FIG. 9 is only one example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 9 illustrates an example of a system comprising a computing device 902 configured to implement one or more embodiments provided herein. In one configuration, computing device 902 includes at least one processing unit 906 and memory 908. Depending on the exact configuration and type of computing device, memory 908 may be volatile (such as RAM, for example), non-volatile (such as ROM, flash memory, etc., for example) or some combination of the two. This configuration is illustrated in FIG. 9 by dashed line 904.

In other embodiments, device 902 may include additional features and/or functionality. For example, device 902 may also include additional storage (e.g., removable and/or non-removable) including, but not limited to, magnetic storage, optical storage, and the like. Such additional storage is illustrated in FIG. 9 by storage 910. In one embodiment, computer readable instructions to implement one or more embodiments provided herein may be in storage 910. Storage 910 may also store other computer readable instructions to implement an operating system, an application program, and the like. Computer readable instructions may be loaded in memory 908 for execution by processing unit 906, for example.

The term "computer readable media" as used herein includes computer storage media. Computer storage media includes volatile and nonvolatile, removable and non-removable media implemented in any method or technology for storage of information such as computer readable instructions or other data. Memory 908 and storage 910 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 902. Any such computer storage media may be part of device 902.

Device 902 may also include communication connection(s) 916 that allows device 902 to communicate with other devices. Communication connection(s) 916 may include, but is not limited to, a modem, a Network Interface Card (NIC), an integrated network interface, a radio frequency transmitter/receiver, an infrared port, a USB connection, or other interfaces for connecting computing device 902 to other computing devices. Communication connection(s) 916 may include a wired connection or a wireless connection. Communication connection(s) 916 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Device 902 may include input device(s) 914 such as keyboard, mouse, pen, voice input device, touch input device, infrared cameras, video input devices, and/or any other input device. Output device(s) 912 such as one or more displays, speakers, printers, and/or any other output device may also be included in device 902. Input device(s) 914 and output device(s) 912 may be connected to device 902 via a wired connection, wireless connection, or any combination thereof. In one embodiment, an input device or an output device from another computing device may be used as input device(s) 914 or output device(s) 912 for computing device 902.

Components of computing device 902 may be connected by various interconnects, such as a bus. Such interconnects may include a Peripheral Component Interconnect (PCI), such as PCI Express, a Universal Serial Bus (USB), Firewire (IEEE 1394), an optical bus structure, and the like. In another embodiment, components of computing device 902 may be interconnected by a network. For example, memory 908 may be comprised of multiple physical memory units located in different physical locations interconnected by a network.

Those skilled in the art will realize that storage devices utilized to store computer readable instructions may be distributed across a network. For example, a computing device 920 accessible via network 918 may store computer readable instructions to implement one or more embodiments provided herein. Computing device 902 may access computing device 920 and download a part or all of the computer readable instructions for execution. Alternatively, computing device 902 may download pieces of the computer readable instructions, as needed, or some instructions may be executed at computing device 902 and some at computing device 920.

F. Usage of Terms

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used in this application, the terms "component," "module," "system", "interface", and the like are generally intended to refer to a computer-related entity, either hardware, a combination of hardware and software, software, or software in execution. One or more components may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

Any aspect or design described herein as an "example" is not necessarily to be construed as advantageous over other aspects or designs. Rather, use of the word "example" is intended to present one possible aspect and/or implementation that may pertain to the techniques presented herein. Such examples are not necessary for such techniques or intended to be limiting. Various embodiments of such techniques may include such an example, alone or in combination with other features, and/or may vary and/or omit the illustrated example.

As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims may generally be construed to mean "one or more" unless specified otherwise or clear from context to be directed to a singular form.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated example implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. A server that provides a service as part of a server set, the server comprising:
    a processor; and
    a memory storing instructions that, when executed by the processor, cause the server to:
        create a container to host a set of replicas of a first partition of a resource set of the service;
        assign to the container an allocation of computing capabilities of the server;
        receive a logical subset of resources of the service for the first partition;
        create a replica in the container for resources of the first partition;
        perform a portion of the service represented by the first partition using a selected resource of the replica, the selected resource being associated with a performance capability;
        responsive to a request to expand the performance capability of the selected resource, provision a second partition that expands the performance capability of the selected resource; and
        responsive to a request to reduce the performance capability of the selected resource, merge the second partition and the first partition.

2. The server of claim 1, wherein:
    the server further comprises a log; and
    performing the portion of the service further comprises:
        recording a set of actions performed by the replica in the log.

3. The server of claim 1, wherein:
    the first partition is associated with a performance capacity; and
    executing the instructions further causes the server to:
        responsive to a request to expand the performance capacity of the first partition, provision a third partition that expands the performance capacity of the first partition; and
        responsive to a request to reduce the performance capacity of the first partition, merge the third partition and the first partition.

4. The server of claim 3, wherein:
    the first partition comprises a subset of the resources that are associated with a future event; and
    the request to expand the performance capacity further comprises an anticipated surge of demand for the subset of the resources of the first partition during the future event.

5. The server of claim 3, wherein:
    the first partition is associated with an active daily period and an inactive daily period;
    the request to expand the performance capacity further comprises a request to expand performance capacity of the first partition during the active daily period; and
    the request to reduce the performance capacity further comprises a request to reduce performance capacity of the first partition during the inactive daily period.

6. The server of claim 1, wherein:
    a third partition is associated with a performance load; and
    executing the instructions further causes the server to:
        compare the performance load of the third partition with a high performance load threshold and a low performance load threshold;
        responsive to the performance load exceeding the high performance load threshold, provision a fourth partition that supplements a performance capacity of the third partition to reduce the performance load; and
        responsive to the performance load succeeding the low performance load threshold, merge the fourth partition and the third partition.

7. A method of configuring a server to provide a service as part of a server set, the method comprising:
    executing, by a processor, instructions that cause the server to:
        create a container to host a set of replicas of a selected partition of a resource set of the service, the selected partition being associated with a performance load;
        assign to the container an allocation of computing capabilities of the server;
        receive a logical subset of resources of the service for the selected partition;
        create a replica in the container for the set of resources comprising the selected partition;
        perform a portion of the service represented by the selected partition using the set of resources of the replica;
        compare the performance load of the selected partition with a high performance load threshold and a low performance load threshold; and
        responsive to the performance load exceeding the high performance load threshold, provision a second partition that supplements a performance capacity of the selected partition to reduce the performance load; and
        responsive to the performance load succeeding the low performance load threshold, merge the second partition and the selected partition.

8. The method of claim 7, wherein:
    the service further comprises a service archive that stores inactive records for the service; and
    executing the instructions further causes the server to:
        responsive to receiving a record for the service, assign a time-to-live period to the record; and
        responsive to an elapsing of the time-to-live period for the record, archiving the record in the service archive.

9. The method of claim 7, wherein:
the service further comprises a workload set of at least two workloads that are respectively associated with a workload computation; and
assigning the allocation of computing capabilities to the container further comprises: assigning an allocation of computing capabilities of the server to the respective workloads of the container.

10. The method of claim 7, wherein:
the service further comprises a set of actions; and
executing the instructions further causes the server to test the service by, for respective actions of the service:
identifying a sequence of interactions among the replicas that perform the action;
while performing the sequence of interactions through the replicas, measuring a performance characteristic of the action; and
comparing the performance characteristic with a threshold performance characteristic.

11. The method of claim 7, wherein:
the server further comprises a set of unallocated partition spaces; and
creating the container further comprises:
selecting an unallocated partition space; and
creating the container for the partition in the unallocated partition space of the server.

12. A method of organizing a server set of servers to provide a service involving a resource set of resources, the method comprising:
partitioning a resource of the resource set into a partition set of partitions, wherein each partition of the partition set comprises a logical subset of the resource, according to a partition key identifying that partition from among other partitions of the partition set and further identifying the resource for which the partition set is provided, and wherein at least one partition key identifies a logical path through a hierarchical organization of partitions and resources of the resource set; and
for a selected partition:
choose a number of replicas for the selected partition; and
for each replica:
choose, from the server set, a server to host that replica;
create a container on the server; and
deploy the resources of the selected partition into the container for that replica; and
responsive to a request to scale the service:
identify at least one container hosting at least one replica of the service; and
adjust the at least one replica of the container to satisfy the request.

13. The method of claim 12, further comprising:
designating a selected replica of the partition as a read/write replica for the partition; and
designating other replicas of the partition as a read-only replica.

14. The method of claim 13, wherein:
each server hosting each replica of the partition is located in a region; and
designating the selected replica as a read/write replica further comprises:
identifying a source region that is anticipated to request writes of the partition; and
from the partition, selecting, as the read/write replica, a replica that is located in a region that is closest to the source region.

15. The method of claim 12, wherein:
each server hosting each replica of the partition is located in a region; and
the method further comprises:
for each region comprising at least one server, designating a failover region where a failover server hosting a second replica of the partition is located; and
responsive to a fault of a selected server hosting that replica:
identifying the region where the selected server is located;
identifying the failover region that is associated with the region;
identifying the failover server in the failover region; and
initiating failover of that replica to the second replica on the failover server.

16. The method of claim 12, further comprising:
establishing a hierarchical organization of the resource set of the service, wherein the hierarchical organization further comprises a hierarchical level for the partition key; and
the method further comprises:
assigning, to a selected partition, a path through the hierarchical organization, wherein the path for the partition is navigated at the hierarchical level using the partition key of the selected partition.

17. The method of claim 12, wherein:
the service further comprises an operational workload and an analytic workload; and
partitioning the resource set further comprises:
generating an operational partition of the resource set to perform the operational workload of the service; and
generating an analytic partition of the resource set to perform the analytic workload of the service.

18. The method of claim 12, wherein:
respective servers are associated with a fault domain that identifies a subset of the servers that are likely to fail together; and
choosing the server to host the replica further comprises:
choosing a server of the server set that is in a different fault domain than the servers of other replicas of the partition.

19. The method of claim 12, further comprising:
associating respective replicas with a logical endpoint; and
responsive to detecting a failure of a selected replica, reassigning the logical endpoint to a second replica.

* * * * *